US012621218B2

(12) United States Patent
Bertolina et al.

(10) Patent No.: US 12,621,218 B2
(45) Date of Patent: May 5, 2026

(54) AUTOMATED DEVICE OS AND APPLICATION MANAGEMENT AT THE EDGE

(71) Applicants: Schneider Electric Systems USA, Inc., Foxboro, MA (US); Schneider Electric USA, Inc., Andover, MA (US)

(72) Inventors: Mark Bertolina, Foxboro, MA (US); Richard Chaney, Foxboro, MA (US); Sandip Mondal, Foxboro, MA (US); Briane Ritchie, Foxboro, MA (US); Ling Wu, Andover, MA (US)

(73) Assignees: Schneider Electric Systems USA, Inc, Foxborough, MA (US); Schneider Electric USA, Inc., Boston, MA (US)

( * ) Notice: Subject to any disclaimer, the term of this patent is extended or adjusted under 35 U.S.C. 154(b) by 114 days.

(21) Appl. No.: 18/378,356

(22) Filed: Oct. 10, 2023

(65) Prior Publication Data

US 2024/0121168 A1 Apr. 11, 2024

Related U.S. Application Data

(60) Provisional application No. 63/414,846, filed on Oct. 10, 2022.

(51) Int. Cl.
*G06F 15/173* (2006.01)
*H04L 41/00* (2022.01)
(Continued)

(52) U.S. Cl.
CPC .......... *H04L 41/24* (2013.01); *H04L 41/5058* (2013.01); *H04L 67/51* (2022.05); *H04L 12/46* (2013.01)

(58) Field of Classification Search
None
See application file for complete search history.

(56) References Cited

U.S. PATENT DOCUMENTS

2016/0283352 A1\* 9/2016 Kraus ..................... H04L 41/40
2021/0208961 A1 7/2021 Dutta et al.
(Continued)

OTHER PUBLICATIONS

International Search Report for PCT Application No. PCT/US2023/034798 dated Feb. 5, 2024.
(Continued)

*Primary Examiner* — Wing F Chan
*Assistant Examiner* — Andrew Woo
(74) *Attorney, Agent, or Firm* — Patterson + Sheridan, LLP

(57) ABSTRACT

Systems/methods for monitoring and management of field devices and equipment at the edge provide an interworking component that runs on or at an edge device to facilitate monitoring and management of the field devices and equipment. In particular, the edge based interworking component allows operations, administration, and management (OA&M) services to be performed for both the hardware making up the devices as well as the operating systems and software applications running on the hardware. In some embodiments, OA&M services includes one or more IT orchestration services for the hardware as well as the operating systems and software applications running on the hardware. Such an arrangement allows monitoring and management of the field devices and equipment that have heretofore been performed by traditional control systems to be partly or entirely pushed down to the edge and/or pushed up to the cloud, depending on the particular implementation.

17 Claims, 7 Drawing Sheets

(51) Int. Cl.
  *H04L 41/50* (2022.01)
  *H04L 67/51* (2022.01)
  *H04L 12/46* (2006.01)

(56) References Cited

U.S. PATENT DOCUMENTS

2022/0075352 A1* 3/2022 Nixon .................. G05B 19/042
2022/0263717 A1 8/2022 Garcia et al.
2022/0404790 A1* 12/2022 Amaro, Jr. .............. H04L 43/20

OTHER PUBLICATIONS

International Written Opinion for PCT Application No. PCT/US2023/
034798 dated Feb. 5, 2024.

* cited by examiner

300

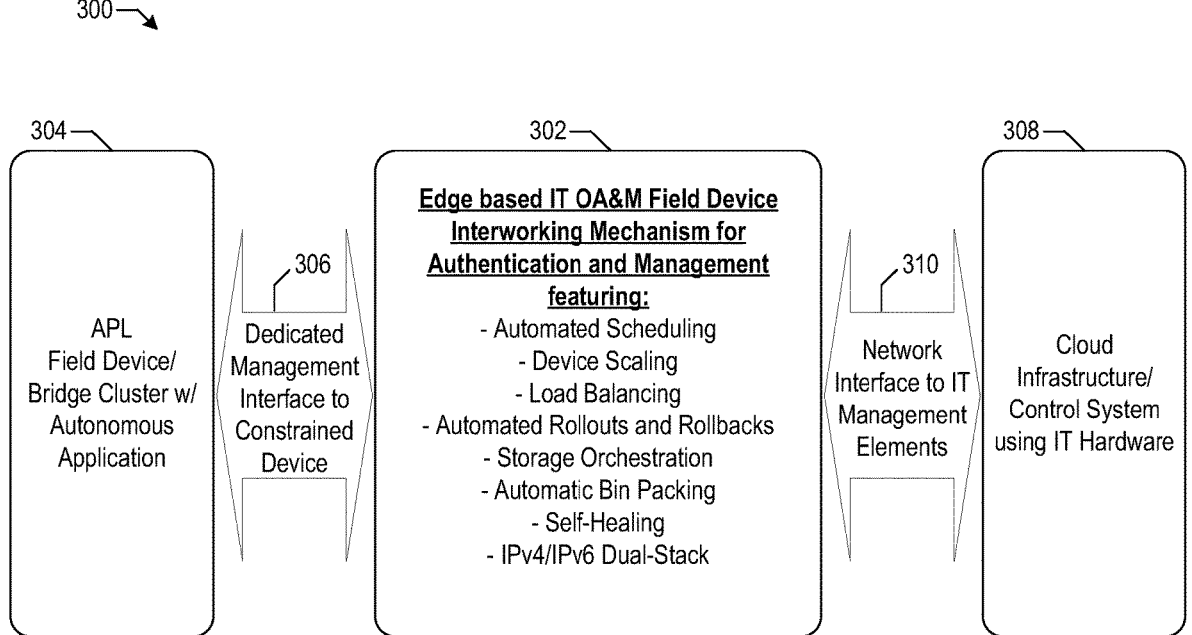

304

APL
Field Device/
Bridge Cluster w/
Autonomous
Application

306

Dedicated
Management
Interface to
Constrained
Device

302

**Edge based IT OA&M Field Device
Interworking Mechanism for
Authentication and Management
featuring:**
- Automated Scheduling
- Device Scaling
- Load Balancing
- Automated Rollouts and Rollbacks
- Storage Orchestration
- Automatic Bin Packing
- Self-Healing
- IPv4/IPv6 Dual-Stack

310

Network
Interface to IT
Management
Elements

308

Cloud
Infrastructure/
Control System
using IT Hardware

FIG. 3

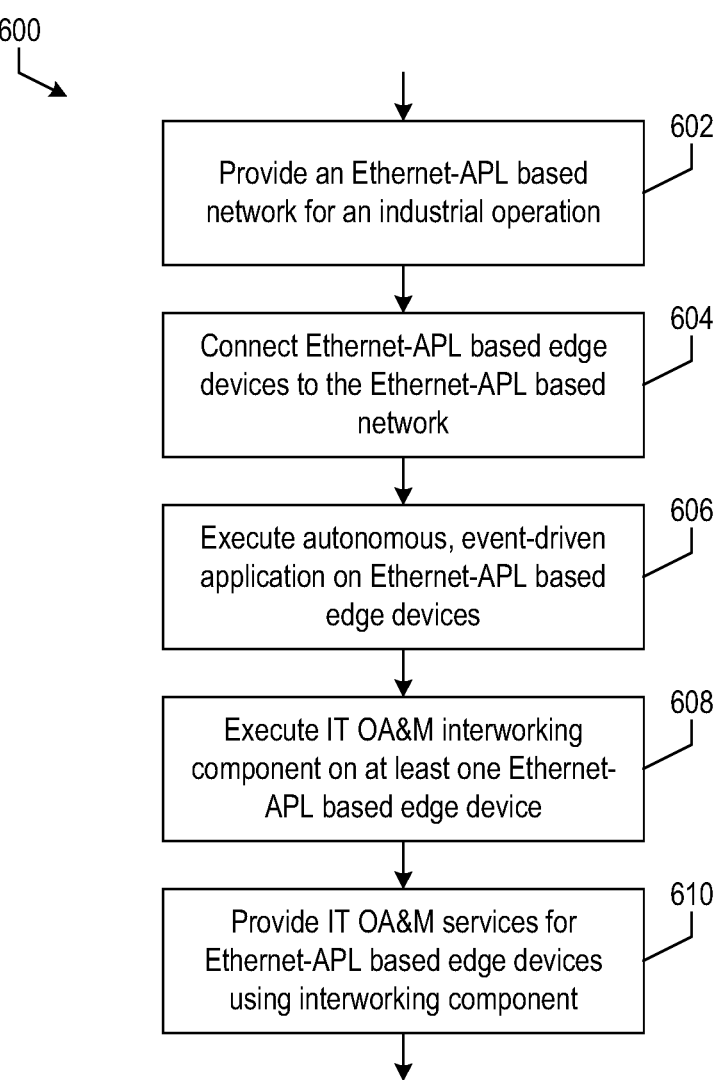

600

602
Provide an Ethernet-APL based network for an industrial operation

604
Connect Ethernet-APL based edge devices to the Ethernet-APL based network

606
Execute autonomous, event-driven application on Ethernet-APL based edge devices 608
Execute IT OA&M interworking component on at least one Ethernet-APL based edge device 610
Provide IT OA&M services for Ethernet-APL based edge devices using interworking component

FIG. 6

AUTOMATED DEVICE OS AND APPLICATION MANAGEMENT AT THE EDGE

CROSS-REFERENCE TO RELATED APPLICATIONS

This application claims the benefit of priority to and incorporates herein by reference U.S. Provisional Application No. 63/414,846, entitled "ADVANCED PHYSICAL LAYER FIELD DEVICE APPLICATION MANAGEMENT AND HUMAN MACHINE INTERFACE," filed Oct. 10, 2022.

FIELD

The present disclosure relates generally to field devices, and more particularly to operations, administration, and management (OA&M) of Ethernet Advanced Physical Layer (Ethernet-APL) based end point field devices.

BACKGROUND

Ethernet is a network communication standard defined in IEEE 802.3 that is widely used in local area networks (LAN), metropolitan area networks (MAN), wide area networks (WAN), and other networks. Ethernet-APL is an extension of the Ethernet standard to support more demanding industrial applications and is defined in IEEE 802.3cg. Among other things, Ethernet-APL provides high-speed communication over long distances, supplies both power and communication signals over a single twisted-pair cable, and implements protective measures that enable safe use of field devices and equipment in hazardous locations.

The availability of power and high-speed communication over long distances in field devices and equipment provides a number of benefits. For example, the power and high-speed communication greatly improves scalability with regard to the number of Ethernet-APL field devices and instruments that can be connected. In addition, the ability to use Ethernet based communication allows more functionally sophisticated field devices and equipment to be deployed. Moreover, transitioning to an Ethernet-APL network is relatively seamless, as most industrial facilities already have an existing Ethernet network.

However, while a number of advances have been made in field devices and equipment, further improvements are continually needed.

SUMMARY

Embodiments of the present disclosure relate to systems and methods for monitoring and management of field devices and equipment at the edge. The systems and methods herein provide an interworking component that runs on or at an edge device to facilitate monitoring and management of the field devices and equipment. In particular, the edge based interworking component allows IT (information technology) operations, administration, and management (OA&M) services to be performed for both the hardware making up the devices as well as the operating systems and software applications running on the hardware. In some embodiments, the OA&M services includes one or more IT orchestration services for the hardware as well as the operating systems and software applications running on the hardware. Such an arrangement allows monitoring and management of the field devices and equipment that have heretofore been performed by traditional control systems to be partly or entirely pushed down to the edge and/or pushed up to the cloud, depending on the particular implementation.

In general, in one aspect, embodiments of the present disclosure relate to an Ethernet-APL based edge device. The Ethernet-APL based edge device comprises, among other things, a processor, and a storage system communicatively coupled to the processor. The Ethernet-APL based edge device additionally comprises an autonomous application stored on the storage system, the autonomous application, when executed by the processor, causes the Ethernet-APL based edge device to perform a predefined device-specific operation. The Ethernet-APL based edge device further comprises an interworking component stored on the storage system, the interworking component, when executed by the processor, allows an external system to provide IT OA&M services to the Ethernet-APL based edge device.

In general, in another aspect, embodiments of the present disclosure relate to an Ethernet-APL based industrial system. The Ethernet-APL based industrial system comprises, among other things, an Ethernet-APL based network, and a plurality of Ethernet-APL based edge devices connected to the Ethernet-APL based network. Each Ethernet-APL based edge device includes an autonomous application thereon that is configured to cause the edge device to perform a predefined device-specific operation. At least one Ethernet-APL based edge device further includes an interworking component thereon that is configured to allow an external system to provide IT OA&M services to the edge device.

In general, in still another aspect, embodiments of the present disclosure relate to a method of monitoring and managing an Ethernet-APL based edge device. The method comprises, among other things, providing an Ethernet-APL based network, and connecting a plurality of Ethernet-APL based edge devices to the Ethernet-APL based network. The method additionally comprises executing an autonomous application on each Ethernet-APL based edge device, the autonomous application configured to cause each edge device to perform a predefined device-specific operation. The method further comprises executing an interworking component on at least one Ethernet-APL based edge device, the interworking component configured to allow an external system to provide IT OA&M services to the edge device.

It is understood that the disclosed invention may be found suitable for use in numerous applications. The applications may include, for example, oil and gas, energy, food and beverage, water and wastewater, chemical, petrochemical, pharmaceutical, metal, and mining and mineral applications.

It is understood that there are many features, advantages and aspects associated with the disclosed invention, as will be appreciated from the discussions below and drawings.

BRIEF DESCRIPTION OF THE DRAWINGS

The foregoing features of the disclosure, as well as the disclosure itself may be more fully understood from the following detailed description of the drawings, in which:

FIG. 3 shows an exemplary edge based IT OA&M interworking for Ethernet-APL based end point field device in accordance with embodiments of the disclosure;

FIG. 6 shows an exemplary method that may be used by or with edge based IT OA&M interworking in accordance with embodiments of the disclosure;

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

For convenience, certain introductory concepts and terms used in the specification are collected here.

As used herein, the term "edge" refers to Layer 0 of the Purdue Network Model for Industrial Control Systems.

As used herein, the term "field device" refers to intelligent field instruments with embedded control/compute/measurement capability implemented on lower power embedded microcontroller based platforms.

As used herein, the term "end point field device" refers to intelligent field instruments operating at the edge of a network that collect and communicate data (e.g., measurements, readings, movements, etc.) to the network.

As used herein, the term "machine learning (ML)" refers to the use and development of software that is able to learn and adapt without following explicit instructions, by using algorithms and statistical models to analyze and draw inferences from patterns in data.

As used herein, the term "embedded device" refers to a combination of a microcontroller, memory, and input/output peripherals—that has a dedicated function within a larger system.

As used herein, the term "networked" means connected via the Ethernet network communication standard.

As used herein, the term "high availability" refers to a device or application that can operate at a high level, continuously, without intervention, for a given time period. High-availability infrastructure is configured to deliver quality performance and handle different loads and failures with minimal or zero downtime.

As used herein, the term "Intrinsically Safe (IS)" refers to an approach to the design of equipment going into hazardous areas that reduces the available energy to a level where it is too low to cause ignition as certified by IEC TS 60079-39 or ATEX.

As used herein, the term "interworking" refers generally to the connection, or process of connecting, different types of computing equipment and/or software applications to allow for exchange of information.

Figure 1:
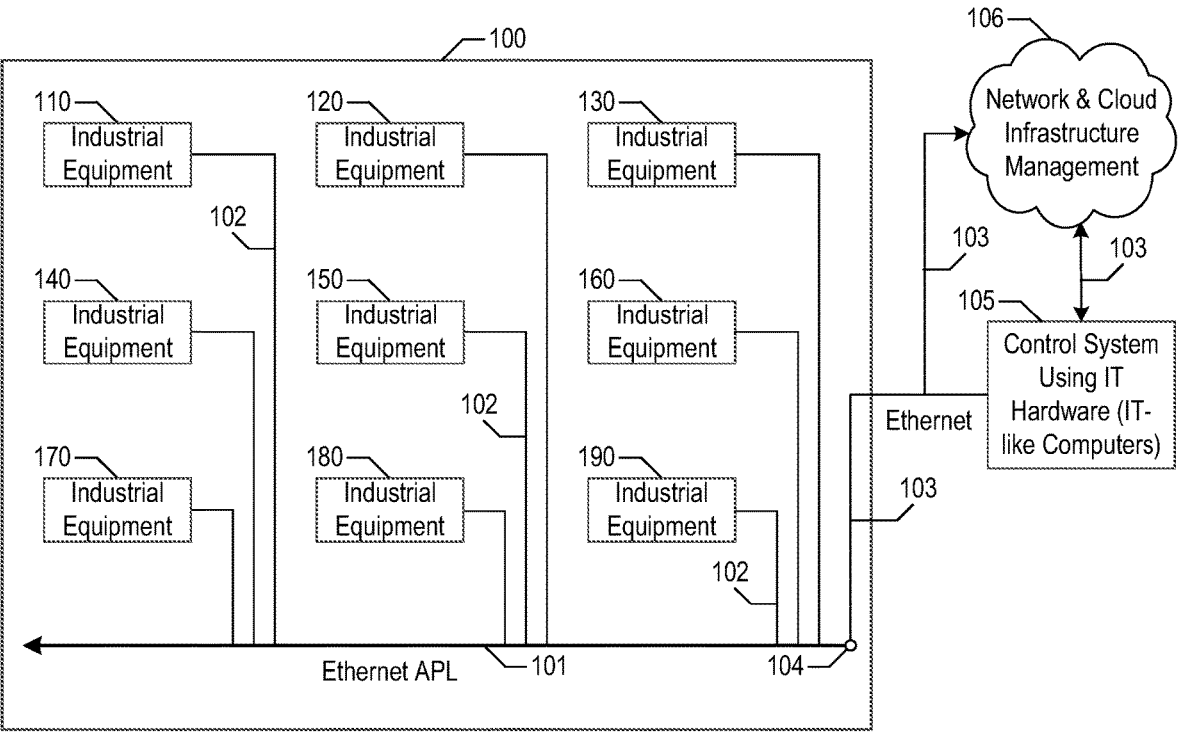
FIG. 1 shows an exemplary industrial location that uses Ethernet-APL based end point field devices in accordance with embodiments of the disclosure.

Referring to now FIG. 1, an industrial plant or operation 100 is shown that uses one or more Ethernet-APL based end point field devices in accordance with embodiments of the disclosure. The industrial operation 100 includes a plurality of industrial equipment connected or otherwise communicatively coupled to an Ethernet-APL based industrial network 101 via network connections 102. The industrial equipment can come in a variety of forms and may be associated with various industrial processes, depending on the industrial operation. For example, the industrial operation 100 may include one or more end point field devices (e.g., RTUs, PLCs, actuators, sensors, HMIs, etc.) that are used to perform, analyze and/or control process variable measurements. These process variable measurements may include pressure, flow rate, fluid level, and temperature, for example. The Ethernet-APL based industrial network 101 may be connected to a standard Ethernet network 103 via one or more APL switches, generally indicated here at 104. This allows the industrial equipment in the industrial operation 100 to be connected to one or more control systems over the Ethernet network 103, such as an IT control system 105 that uses IT hardware (IT-like computers), as well as network and cloud infrastructure management systems 106.

In the FIG. 1 example, the plurality of industrial equipment (which includes devices) are depicted at 110, 120, 130, 140, 150, 160, 170, 180, 190 and are capable of both wireless and wired communication. These industrial equipment 110-190 may be associated with a particular application (e.g., an industrial application), several different applications, and/or process(es). The industrial equipment 110-190 may include electrical or electronic equipment, for example, such as machinery associated with the industrial operation 100 (e.g., a manufacturing or natural resource extraction operation). The industrial equipment 110-190 may also include the controls and/or ancillary equipment associated with the industrial operation 100, for example, field devices (e.g., RTUs, PLCs, actuators, sensors, HMIs) that are used to perform, analyze and/or control process variable measurements. In embodiments, the industrial equipment 110-190 may be installed or located in one or more facilities (i.e., buildings) or other physical locations (i.e., sites) associated with the industrial operation 100. The facilities may correspond to industrial buildings or plants, for example, and/or they may correspond to geographical areas or locations, for example.

In a similar manner, the network connection 102 may be a simple 4-20 mA connection or a HART ("Highway Addressable Remote Transducer") connection where the one or more industrial equipment 110-190 is a legacy device, or the network connection 102 may be an Ethernet-APL connection like the Ethernet-APL connection 101 where the one or more industrial equipment 110-190 is an Ethernet-APL device.

The industrial equipment 110-190 may each be configured to perform one or more tasks in some embodiments. For example, at least one of the industrial equipment 110-190 may be configured to produce or process one or more products, or a portion of a product, associated with the industrial operation 100. Additionally, at least one of the industrial equipment 110-190 may be configured to sense or monitor one or more parameters (e.g., industrial parameters) associated with the industrial operation 100. For example, industrial equipment 110 may include or be coupled to a temperature sensor configured to sense temperatures associated with the industrial equipment 110. The temperatures may include ambient temperature proximate to the industrial equipment 110, temperature of a process associated with the industrial equipment 110, temperature of a product produced by the industrial equipment 110, and the like. The industrial equipment 110 may additionally or alternatively include one or more pressure sensors, flow rate sensors, fluid level sensors, vibration sensors and/or any number of other sensors used by applications or processes associated with the industrial equipment 110. The applications or processes may involve water, air, gas, electricity, steam, oil, and the like in one example embodiment.

The industrial equipment 110-190 may take various forms and may each have an associated complexity (or set of functional capabilities and/or features). For example, industrial equipment 110 may correspond to a "basic" industrial equipment, industrial equipment 120 may correspond to an "intermediate" industrial equipment, and industrial equipment 130 may correspond to an "advanced" industrial equipment. In such embodiments, intermediate industrial equipment 120 may have more functionality (e.g., measurement features and/or capabilities) than basic industrial equipment 110, and advanced industrial equipment 130 may have more functionality and/or features than intermediate industrial equipment 120. For example, in embodiments industrial equipment 110 (e.g., industrial equipment with basic capabilities and/or features) may be capable of monitoring one or more first characteristics of an industrial process, and industrial equipment 130 (e.g., industrial equipment with advanced capabilities) may be capable of monitoring one or more second characteristics of the industrial process, with the second characteristics including the first characteristics and one or more additional parameters. It is understood that this example is for illustrative purposes only, and likewise in some embodiments the industrial equipment 110-190 may each have independent functionality.

In accordance with embodiments of the present disclosure, an edge based interworking component is provided to facilitate monitoring and management of the industrial equipment at the industrial operation 100. The interworking component runs on or at one or more edge devices at the industrial operation 100 to allow operations, administration, and management (OA&M) services and related processes to be provided to the industrial equipment 110-190 from the edge, as opposed to traditional IT control systems. Such OA&M services monitor and manage both the hardware making up the equipment as well as the operating systems and software applications running on the hardware. The OA&M services may include software and firmware updates, device configuration changes, device health monitoring, and the like, and can be provided both automatically and on a manual basis. These IT OA&M services are performed separately and apart from any operations normally provided by the industrial equipment 110-190, such as data acquisition, actuation, or other device-specific functionality normally provided by the industrial equipment 110-190.

Figure 2:
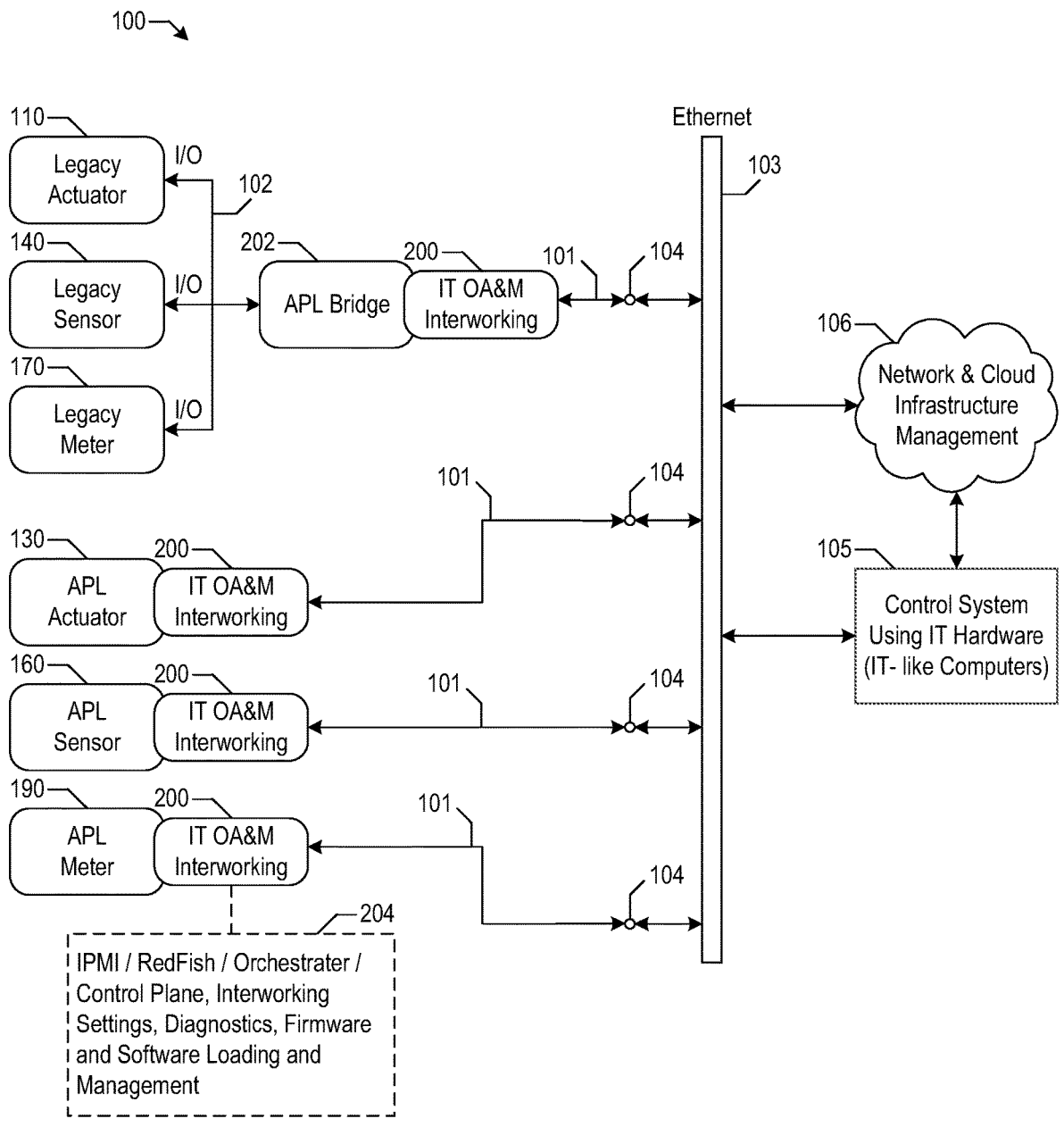
FIG. 2 shows exemplary edge based IT OA&M interworking for an industrial location in accordance with embodiments of the disclosure.

FIG. 2 shows a particular example of the industrial operation 100 from FIG. 1 in which one or more legacy end point field devices, as well as one or more Ethernet-APL based end point field devices, are deployed throughout the industrial operation 100. As can be seen, the industrial operation 100 here includes a legacy actuator 110, a legacy sensor 140, and a legacy meter 170, as well as an APL actuator 130, an APL sensor 160, and an APL meter 190. These field devices are connected directly or indirectly to the Ethernet-APL network 101, which in turn connects the devices to the Ethernet network 103 via one or more APL switches 104. This arrangement allows Ethernet connectivity to extend from one or more control systems, such as the IT control system 105 and the network and cloud infrastructure management systems 106, all the way down to the field devices in the industrial operation 100.

In accordance with embodiments of the present disclosure, the one or more legacy end point field devices 110, 140, 170 and the one or more APL end point field devices 130, 160, 190 may be provided with an edge based IT OA&M interworking component 200 to facilitate provisioning of IT OA&M services to the field devices at the edge. For the one or more legacy field devices 110, 140, 170, the IT OA&M interworking component 200 runs on an APL bridge 202 that connects one or more, or a cluster of legacy field devices to the Ethernet-APL network 101. The APL bridge 202 operates to convert analog and/or digital inputs and outputs (e.g., 4-20 mA, HART, etc.), as indicated at 102, from the legacy field devices 110, 140, 170 into a format that can be transmitted over the Ethernet-APL network 101. The IT OA&M interworking component 200 can then run on the APL bridge 202 as a separate process that is distinct from the APL bridge application framework, or it can form part of the APL bridge application framework.

No APL bridge is needed for the APL field devices 130, 160, 190, as these APL field devices are designed to be connected directly to the Ethernet-APL network 101. For these APL field devices 130, 160, 190, the edge based IT OA&M interworking component 200 can run directly on the field devices themselves, either as a separate process that is distinct from the APL device application framework, or it can form part of the device application framework.

Because the APL bridge 202 and the APL field devices 130, 160, 190 comply with the IEEE Std 802.3cg-2019 and IEC TS 60079-47 (2-WISE) Ethernet-APL standard, they can be made to satisfy the Intrinsically Safe (IS) requirements of ATEx or IECEx as part of an IS system. This means the APL bridge 202, the APL field devices 130, 160, 190, and the IT OA&M interworking component 200 running thereon, have a lower risk of failure when operating in a hazardous environment. And because Ethernet-APL carries power all the way out to the edge, this means the APL bridge 202 and the APL field devices 130, 160, 190 can now supply sufficient power for running various IT OA&M services at the edge. As such, functionality provided by traditional IT control systems and other components that typically resided at the mid to upper levels of the industrial network model (e.g., Purdue Network Model) can be pushed out to the cloud and/or pushed down to the edge and/or removed entirely.

With connectivity available all the way up to the cloud (and levels in between), the IT OA&M interworking component 200 allows the various legacy field devices 110, 140, 170 and APL field devices 130, 160, 190 to access and use powerful cloud-based resources by virtue of the increased bandwidth provided by Ethernet-APL. Such access was unavailable previously when field devices were limited to serial interfaces or single-line 4-20 mA interfaces at the edge. Among other things, the IT OA&M interworking component 200 allows IT orchestration services 204 to be provided to one or more of the field devices 110, 140, 170 and 130, 160, 190. IT orchestration is considered to be an aspect of IT OA&M that automates various IT services, including configuration, management, and coordination of computer systems, applications, and services. Whereas OA&M services usually involve automating individual tasks, orchestration typically involves automating an entire process or a workflow that includes a series of related tasks. This helps IT personnel more easily manage complex tasks and workflows and greatly reduces the time required to manage large and complex networks, thus allowing network administrators to focus on more strategic initiatives.

In the example of FIG. 2, the IT orchestration services 204 may be, or include, services similar to the types of services provided by IPMI (Intelligent Platform Management Interface) developed by Intel Corp., RedFish developed by DMTF (Distributed Management Task Force), Orchestrator develop by Microsoft Corp., and other known IT orchestration platforms. The IT orchestration services 204 may also include a control plane for controlling how data packets are forwarded in the network, and interworking settings that may be used to configure the interworking component. The IT orchestration services 204 may further include diagnostics services, firmware and software loading and management services, and the like.

FIG. 3 shows an exemplary architecture 300 that may be used to implement edge based IT OA&M services for Ethernet-APL end point field devices in accordance with embodiments of the present disclosure. As the figure shows, the central component for implementing edge based IT OA&M is an edge based IT OA&M interworking mechanism or component 302. The edge based IT OA&M interworking mechanism or component 302 is designed to facilitate various OA&M services, including authentication services (i.e., prevent unauthorized access to field devices) and management services. To this end, the IT OA&M interworking component 302 may include, in some embodiments, functionality that facilitates automated task scheduling services, device expansion and scaling services, load balancing services, automated software/firmware rollout and rollback services, data storage orchestration services, automatic bin packing (i.e., resource allocation optimization) services, device repair and self-healing services, and IPv4/IPv6 dual stacking services.

The edge based IT OA&M interworking component 302 interfaces on the downstream side with one or more Ethernet-APL end point field devices or an APL bridge cluster 304 over a dedicated management interface 306. These end point field devices 304 may include sensors, actuators, meters, and the like, and are generally considered to be constrained devices insofar as they are typically designed to perform specific applications and functions. On the upstream side, the edge based IT OA&M interworking component 302 interfaces one or more cloud infrastructure or control systems 308 over a network interface 310. The cloud infrastructure or control systems 308 may be, or include, IT management elements that can provision IT OA&M services, including IT orchestration services.

Figure 4:
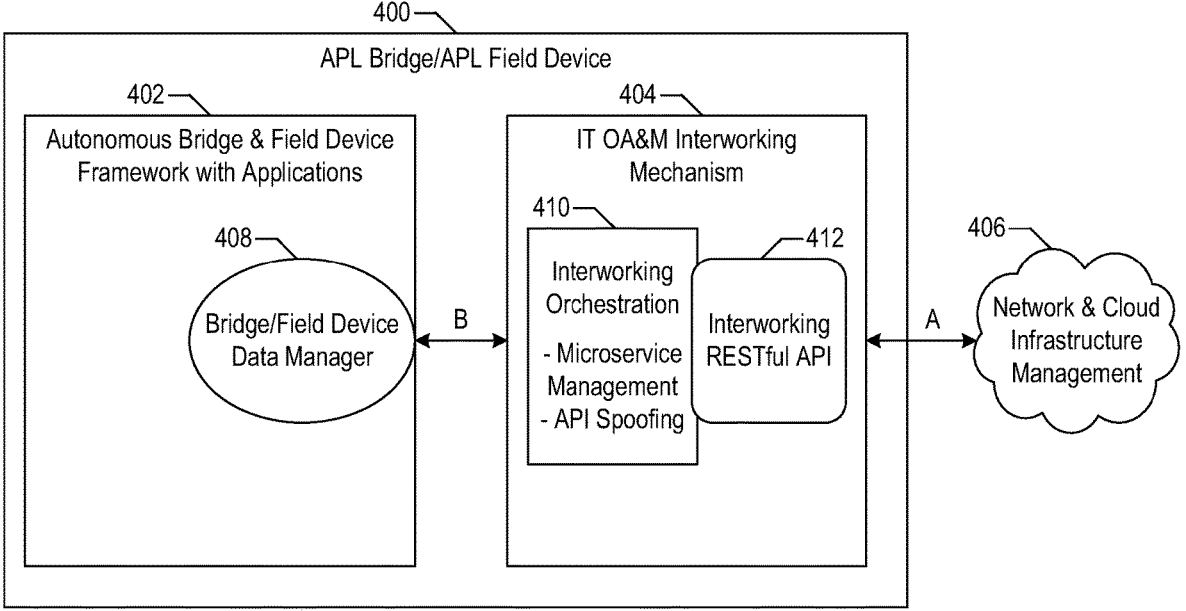
FIG. 4 shows an exemplary Ethernet-APL based end point field device equipped with IT OA&M interworking in accordance with embodiments of the disclosure.

FIG. 4 shows an exemplary implementation of an APL bridge or an APL end node field device 400 having an edge based IT OA&M interworking mechanism or component stored thereon (e.g., in a device memory or storage system). The APL bridge/APL field device 400 in this example is depicted generally as an APL bridge/APL field device 400 having an autonomous bridge and field device framework 402 and an IT OA&M interworking mechanism or component 404 running thereon. In either case, the presence of the IT OA&M interworking component 404 allows the APL bridge/APL field device 400 to utilize IT OA&M services provided by one or more network and cloud-based infrastructure management systems 406. In this example, the one or more network and cloud-based systems 406 are implemented based on the well-known REST (Representational State Transfer) architectural style characterized by loosely coupled and stateless applications. As such, any interaction with the one or more network and cloud-based systems 406 must use a so-called RESTful API (application programming interface). Alternatives to REST, such as OpenAPI and others, may of course be used in other embodiments.

The bridge and field device framework 402 supports various device applications running thereon. In the case of an APL field device 400, the device applications are autonomous, event-driven applications that allow the field devices to operate in accordance with their purpose in the industrial operation. Examples include sensor applications that cause the device to automatically sample the temperature from a particular flow line according to a predefined schedule, actuator applications that cause the device to open/close one or more valves in the flow line if the temperature exceeds a certain threshold, and the like. In the case of an APL field device 400, the device applications convert the analog and/or digital inputs and outputs from legacy field devices into a format that can be transmitted on an Ethernet-APL network.

The data and other information acquired by the APL field device 400 or provided by other field devices to the APL bridge 400 are collected at a bridge/field device data manager 408. The data manager 408 is basically a central repository or database for the data acquired by the APL field device 400 or that comes into the APL bridge 400 from the autonomous processes of the connected field devices, typically via their IEC 61499 function blocks. But data generated using IEC 61499 function blocks do not comply with the requirements of a RESTful API. Accordingly, the IT OA&M interworking component 404 is needed to provide a connection between the autonomous processes of the APL bridge/APL field device 400 and the REST based IT OA&M services provided by the one or more network and cloud-based systems 406, and particularly the IT orchestration services thereof.

The IT OA&M interworking component 404 operates to map data from the autonomous applications of the APL bridge/APL field device 400 to a RESTful API. In particular, the IT OA&M interworking component 404 treats the outputs of the IEC 61499 distributed automation function blocks of the APL bridge/APL field device 400 as stateless, loosely coupled microservice requests that can be mapped to a RESTful API. To this end, the IT OA&M interworking component 404 has two main modules, an interworking orchestration module 410, and an interworking RESTful API module 412. The interworking orchestration module 410 provides microservice management for the autonomous cluster application data generated via the bridge and field device framework 402, while the interworking RESTful API module 412 packages or otherwise conforms the microservice requests to a RESTful API. The interworking RESTful API module 412 then sends the REST compliant requests to the one or more network and cloud-based systems 406 over an Ethernet-APL link, designated "A" here. At the one or more network and cloud-based systems 406, various cloud-based computing resources are applied to parse and process the microservice requests and provide appropriate responses to the requests.

In a similar manner, IT OA&M services, including IT orchestration services, from the one or more network and cloud-based systems 406 are sent as REST compliant requests over the Ethernet-APL link A to the APL bridge/APL field device 400. The REST compliant requests are received and processed by the interworking RESTful API module 412 and provided to the interworking orchestration module 410. The interworking orchestration module 410, which has a connection to the Ethernet stack, converts the RESTful API requests into a form that can be used to access the data manager 408. This is done over an internal interface between the autonomous, asynchronous event-driven applications in the bridge and field device framework 402 and the IT OA&M interworking component 404, designated "B" here. Thus, for example, if the IT orchestration services include performing a firmware download to the APL bridge/APL field device 400, the interworking orchestration module 410 provides the appropriate input needed to deactivate parts of the APL bridge/APL field device 400 that are affected by the firmware download to allow the firmware to be installed.

To achieve the above, in some embodiments, the interworking orchestration module 410 does more than merely perform one-to-one command conversion. It has sufficient intelligence to know what is needed to carry out the IT orchestration requests and commands. To this end, the interworking orchestration module 410 includes a microservice management service and an API spoofing service in some embodiments. The microservice management service processes IT orchestration requests and commands as well as other IT OA&M requests and commands, determines which tasks, data, parameters, and the like, need to be provided to the bridge and field device framework 402 to carry out the IT orchestration requests and commands, and provides them accordingly. While this is happening, the API spoofing service keeps the one or more network and cloud-based systems 406 on the other side of the RESTful API engaged by making the APL bridge/APL field device 400 appear active and responsive. For example, the API spoofing service may send a message of the type that would be expected to be received by the one or more network and cloud-based systems 406. Such a message may indicate, for example, that the APL bridge/APL field device 400 is "busy" processing the IT orchestration requests and commands, or confirm that the requests and commands have been "submitted," and the like.

Figure 5:
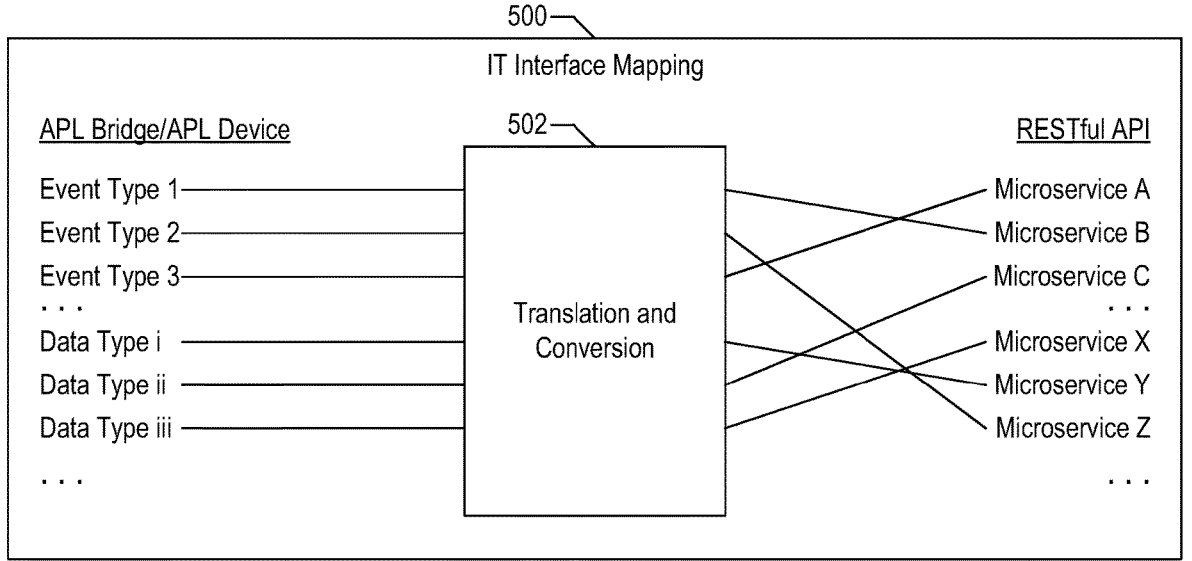
FIG. 5 shows an exemplary IT interface map that may be used by an edge based IT OA&M interworking in accordance with embodiments of the disclosure.

FIG. 5 shows an exemplary IT interface mapping component 500 that may be used by or with the microservice management service of the interworking orchestration module 410 in accordance with embodiments of the disclosure. The IT interface mapping component 500 conceptually illustrates how the interworking orchestration module 410 may handle requests and commands between the APL bridge/APL field device 400 and the one or more network and cloud-based systems 406. Those having ordinary skill in the art will appreciate that the specific details of the IT interface map 500 will vary depending on the particular implementation requirements.

In the example of FIG. 5, the IT interface mapping component 500 includes a translation and conversion module 502 that operates to process events, data, and other parameters from the APL bridge and APL device side and maps them to microservices on the RESTful API side, and vice versa. Thus, for a given IT orchestration command or request, the translation and conversion module 502 may process one or more microservices A, B, C and X, Y, Z on the RESTful API side, and determine which one or more event types 1, 2, 3 and data types i, ii, iii on the APL bridge and APL device side are needed in order to fulfill the orchestration command or request. In some embodiments, this processing may involve the use of one or more tables (e.g., lookup tables) that cross reference one or more event types and data types with one or more micro services in a manner known to those skilled in the art. Other techniques for translation and conversion may also be used by those having ordinary skill in the art within the scope of the present disclosure. The appropriate event types, data types, and other parameters may then be provided to the APL bridge and APL device side to carry out the orchestration.

Turning now to FIG. 6, an exemplary flowchart 600 is shown representing a method that may be used by, or in conjunction with, an Ethernet-APL based edge device to provide monitoring and management of the edge device in an industrial operation. The method generally begins at block 602 where an Ethernet-APL based network is provided for the industrial operation. At block 604, a plurality of Ethernet-APL based edge devices are connected to the Ethernet-APL based network of the industrial operation. The edge devices may include one or more Ethernet-APL bridges and one or more Ethernet-APL based end point field devices. In the case of an Ethernet-APL bridge, one or more legacy end point field devices may be connected to the APL bridge to provide Ethernet-APL connectivity to the legacy field devices.

At block 606, the Ethernet-APL based edge devices are operated according to their intended purpose in the industrial operation. In the case of the Ethernet-APL based end point field devices or the legacy field devices, an autonomous, event driven application is executed on each device to perform a predefined device-specific operation. Examples include sensing devices, actuator devices, metering devices, and the like. In the case of an Ethernet-APL bridge, the autonomous application converts analog and/or digital inputs and outputs from the legacy field devices into a format that can be transmitted over the Ethernet-APL network.

At block 608, an IT OA&M interworking component is executed on at least one Ethernet-APL based edge device, such as the APL bridge, and one or more Ethernet-APL based end point field devices. The IT OA&M interworking component is configured to allow an external system, such as a control system that use IT hardware or a network or cloud infrastructure management system, to provide IT OA&M services to the edge device. In some embodiments, block 608 involves providing IT orchestration services to the edge device as part of the IT OA&M services. In some embodiments, block 608 involves providing an interworking orchestration component in the interworking component that is configured to perform microservice management services for the autonomous application. In some embodiments, block 608 involves providing an IT interface mapping service in the microservice management services that is configured to map event types and data types of the autonomous application to one or more microservices of the external system, and vice versa. In some embodiments, block 608 involves providing a spoofing service in the microservice management services that is configured to provide one or more messages expected to be received by the external system. In some embodiments, block 608 involves providing an interworking application programming interface (API) component in the interworking component that is configured to allow the device to interact with the external system using an API of the external system.

At block 610, IT OA&M services are provided by the external system to the plurality of Ethernet-APL based edge devices using the IT OA&M interworking component, as described above.

Figure 7:
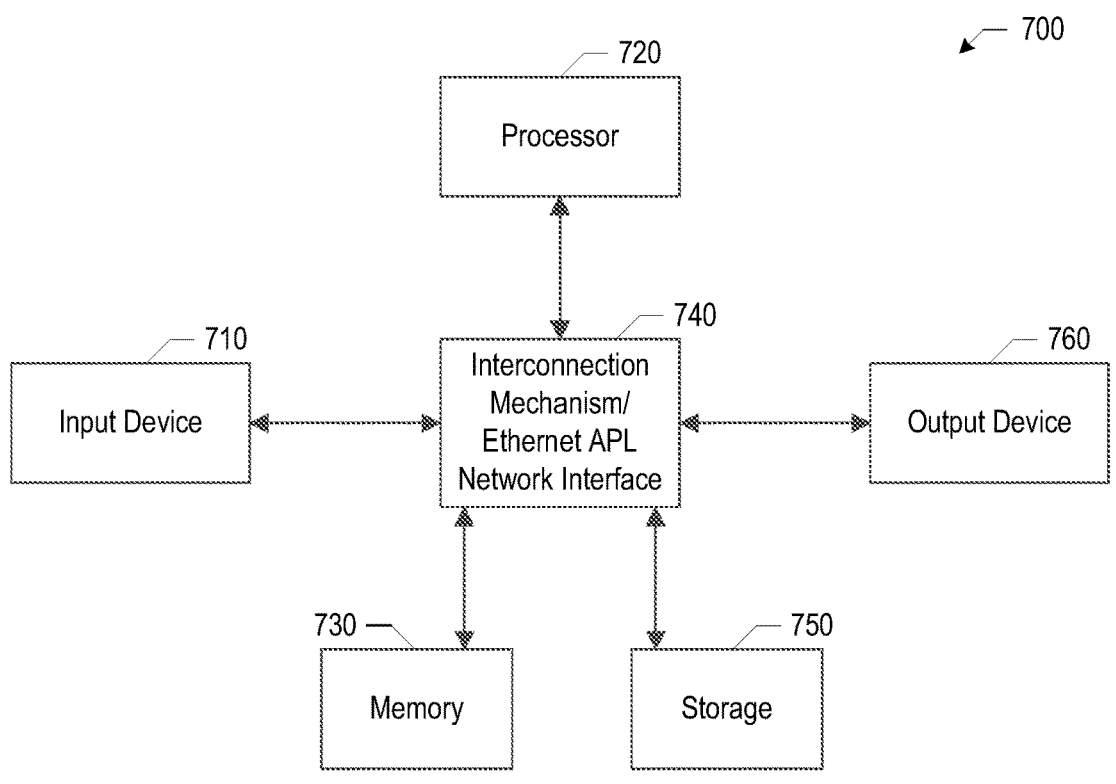
FIG. 7 shows a functional block diagram of an exemplary edge device that may be used to implement various embodiments of this disclosure.

FIG. 7 illustrates an exemplary device that may be used to implement various embodiments of this disclosure. For example, various embodiments of the disclosure may be implemented as specialized software executing in a device 700 such as that shown in FIG. 7. The device 700 may include a processor 720 connected to one or more memory devices 730, such as magnetic or solid state memory, either embedded and discrete, or other memory devices for storing data. Memory 730 is typically used for storing programs and data during operation of the device 700. The device 700 may also include a storage system 750 that provides additional storage capacity. Components of device 700 may be coupled by an interconnection mechanism 740, which may include one or more busses (e.g., between components that are integrated within the same machine) and/or a network interface (e.g., between components that reside on separate discrete machines), including an Ethernet-APL network interface. The interconnection mechanism 740 enables communications (e.g., data, instructions) to be exchanged between system components of system 700 and system components of other systems on the network.

Device 700 also includes one or more input devices 710, for example, keys, buttons, microphone, touch screen, and one or more output devices 760, for example, a display screen, LEDs, and the like. In addition, device 700 may contain one or more interfaces (not shown) that connect device 700 to a communication network (in addition or as an alternative to the interconnection mechanism 740).

Figure 8:
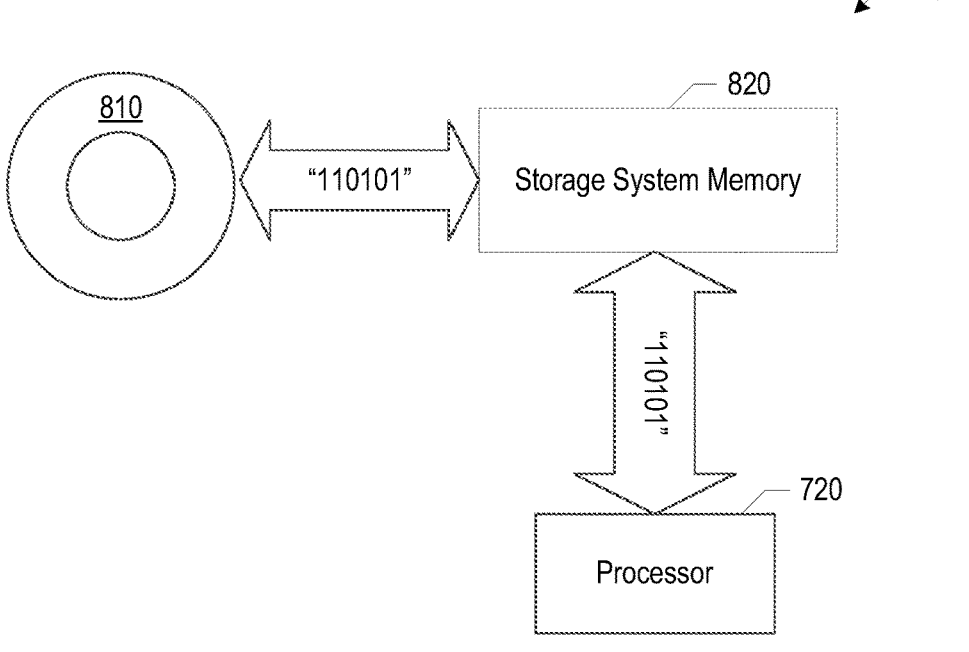
FIG. 8 shows a functional block diagram of a storage system that may be used to implement various embodiments of this disclosure.

The storage system 750, shown in greater detail in FIG. 8, typically includes a computer readable and writeable non-volatile recording medium 810 in which signals are stored that define a program to be executed by the processor 720 or information stored on or in the medium 810 to be processed by the program to perform one or more functions associated with embodiments described herein. To this end, the processor 720 may be any suitable processing unit, such as a microprocessor, microcontroller, ASIC, and the like, and the medium any suitable recording medium, such as a magnetic or solid-state memory. Typically, in operation, the processor 720 causes data to be read from the nonvolatile recording medium 810 into storage system memory 820 that allows for faster access to the information by the processor than does the medium 810. This storage system memory 820 is typically a volatile, random access memory such as a dynamic random-access memory (DRAM) or static memory (SRAM). This storage system memory 820 may be located in storage system 750, as shown, or in the system memory 730. The processor 720 generally manipulates the data within the memory system 820 and then copies the data to the medium 810 after processing is completed. A variety of mechanisms are known for managing data movement between the medium 810 and the integrated circuit memory element 820, and the disclosure is not limited thereto. The disclosure is not limited to a particular memory 820, memory 730 or storage system 750.

The device 700 may include specially programmed, special-purpose hardware, for example, an application-specific integrated circuit (ASIC). Aspects of the disclosure may be implemented in software, hardware or firmware, or any combination thereof. Further, such methods, acts, systems, system elements and components thereof may be implemented as part of the device described above or as an independent component.

Although the device 700 is shown by way of example as one type of device upon which various aspects of the disclosure may be practiced, it should be appreciated that aspects of the disclosure are not limited to being implemented on the device as shown in FIG. 7. Various aspects of the disclosure may be practiced on one or more devices having a different architecture or components from that shown in FIG. 7. Further, where functions or processes of embodiments of the disclosure are described herein (or in the claims) as being performed on a processor or controller, such description is intended to include systems that use more than one processor or controller to perform the functions.

In the preceding, reference is made to various embodiments. However, the scope of the present disclosure is not limited to the specific described embodiments. Instead, any combination of the described features and elements, whether related to different embodiments or not, is contemplated to implement and practice contemplated embodiments. Furthermore, although embodiments may achieve advantages over other possible solutions or over the prior art, whether or not a particular advantage is achieved by a given embodiment is not limiting of the scope of the present disclosure. Thus, the preceding aspects, features, embodiments and advantages are merely illustrative and are not considered elements or limitations of the appended claims except where explicitly recited in a claim(s).

It will be appreciated that the development of an actual commercial application incorporating aspects of the disclosed embodiments will require many implementation-specific decisions to achieve a commercial embodiment. Such implementation specific decisions may include, and likely are not limited to, compliance with system related, business related, government related and other constraints, which may vary by specific implementation, location and from time to time. While a developer's efforts might be considered complex and time consuming, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

This disclosure is not limited in its application to the details of construction and the arrangement of components set forth in the following descriptions or illustrated by the drawings. The disclosure is capable of other embodiments and of being practiced or of being carried out in various ways. Also, the phraseology and terminology used herein is for the purpose of descriptions and should not be regarded as limiting. The use of "including," "comprising," "having," "containing," "involving," and variations herein, are meant to be open-ended, i.e., "including but not limited to."

The various embodiments disclosed herein may be implemented as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer-readable medium(s) having computer-readable program code embodied thereon.

Any combination of one or more computer-readable medium(s) may be utilized. The computer-readable medium may be a non-transitory computer-readable medium. A non-transitory computer-readable medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer-readable medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages. Moreover, such computer program code can execute using a single computer system or by multiple computer systems communicating with one another (e.g., using a local area network (LAN), wide area network (WAN), the Internet, etc.). While various features in the preceding are described with reference to flowchart illustrations and/or block diagrams, a person of ordinary skill in the art will understand that each block of the flowchart illustrations and/or block diagrams, as well as combinations of blocks in the flowchart illustrations and/or block diagrams, can be implemented by computer logic (e.g., computer program instructions, hardware logic, a combination of the two, etc.). Generally, computer program instructions may be provided to a processor(s) of a general-purpose computer, special-purpose computer, or other programmable data processing apparatus. Moreover, the execution of such computer program instructions using the processor(s) produces a machine that can carry out a function(s) or act(s) specified in the flowchart and/or block diagram block or blocks.

One or more portions of the computer system may be distributed across one or more computer systems coupled to a communications network. For example, as discussed above, a computer system that determines available power capacity may be located remotely from a system manager. These computer systems also may be general-purpose computer systems. For example, various aspects of the disclosure may be distributed among one or more computer systems configured to provide a service (e.g., servers) to one or more client computers, or to perform an overall task as part of a distributed system. For example, various aspects of the disclosure may be performed on a client-server or multi-tier system that includes components distributed among one or more server systems that perform various functions according to various embodiments of the disclosure. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present disclosure.

It should be appreciated that the disclosure is not limited to executing on any particular system or group of systems. Also, it should be appreciated that the disclosure is not limited to any particular distributed architecture, network, or communication protocol.

Various embodiments of the present disclosure may be programmed using an object-oriented programming language, such as SmallTalk, Java, C++, Ada, or C# (C-Sharp). Other object-oriented programming languages may also be used. Alternatively, functional, scripting, and/or logical programming languages may be used, such as BASIC, Fortran, Cobol, TCL, or Lua. Various aspects of the disclosure may be implemented in a non-programmed environment (e.g., analytics platforms, or documents created in HTML, XML or other format that, when viewed in a window of a browser program render aspects of a graphical-user interface (GUI)

or perform other functions). Various aspects of the disclosure may be implemented as programmed or non-programmed elements, or any combination thereof.

The flowchart and block diagrams in the Figures illustrate the architecture, functionality and/or operation of possible implementations of various embodiments of the present disclosure. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus far, a number of features and advantages of embodiments of the present disclosure have been shown and described. Other possible features and advantages associated with the disclosed embodiments will be appreciated by one of ordinary skill in the art. It should also be understood that embodiments of the disclosure herein may be configured as a system, method, or combination thereof. Accordingly, embodiments of the present disclosure may be comprised of various means including hardware, software, firmware or any combination thereof.

It is to be appreciated that the concepts, systems, circuits and techniques sought to be protected herein are not limited to use in the example applications described herein (e.g., industrial applications), but rather may be useful in substantially any application where it is desired to monitor, whether visually or remotely, the status/configuration of a device or equipment. While particular embodiments and applications of the present disclosure have been illustrated and described, it is to be understood that embodiments of the disclosure not limited to the precise construction and compositions disclosed herein and that various modifications, changes, and variations can be apparent from the foregoing descriptions without departing from the spirit and scope of the disclosure as defined in the appended claims.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above. Accordingly, it is submitted that that scope of the patent should not be limited to the described embodiments but rather should be limited only by the spirit and scope of the following claims.

What is claimed is:

1. An Ethernet Advanced Physical Layer (Ethernet-APL) based edge device, comprising:
   a processor;
   a storage system communicatively coupled to the processor;
   an autonomous application stored on the storage system, the autonomous application, when executed by the processor, causes the Ethernet-APL based edge device to perform a predefined device-specific operation; and an interworking component stored on the storage system, the interworking component, when executed by the processor, allows an external system to provide IT (information technology) operations, administration, and management (OA&M) services to the Ethernet-APL based edge device, wherein the interworking component includes an interworking application programming interface (API) component configured to allow the Ethernet-APL based edge device to interact with the external system using an API of the external system.

2. The Ethernet-APL based edge device of claim 1, wherein the IT OA&M services include IT orchestration services.

3. The Ethernet-APL based edge device of claim 1, wherein the interworking component includes an interworking orchestration component configured to perform microservice management services for the autonomous application.

4. The Ethernet-APL based edge device of claim 3, wherein the microservice management services includes an IT interface mapping service configured to map event types and data types of the autonomous application to one or more microservices for the external system.

5. The Ethernet-APL based edge device of claim 3, wherein the interworking orchestration component includes a spoofing service configured to provide one or more messages of a type expected to be received by the external system.

6. The Ethernet-APL based edge device of claim 1, wherein the Ethernet-APL based edge device is: an Ethernet-APL end point field device, or an Ethernet-APL bridge.

7. An Ethernet Advanced Physical Layer (Ethernet-APL) based industrial system, comprising:
an Ethernet-APL based network; and
a plurality of Ethernet-APL based edge devices connected to the Ethernet-APL based network, each of a respective Ethernet-APL based edge device including an autonomous application thereon configured to cause the respective Ethernet-APL based edge device to perform a predefined device-specific operation;
wherein at least one of the respective Ethernet-APL based edge devices of the plurality of Ethernet-APL based edge devices further includes an interworking component thereon, the interworking component configured to allow an external system to provide IT (information technology) operations, administration, and management (OA&M) services to the at least one of the respective Ethernet-APL based edge devices, wherein the interworking component includes an interworking application programming interface (API) component configured to allow the at least one of the respective Ethernet-APL based edge devices to interact with the external system using an API of the external system.

8. The Ethernet-APL based industrial system of claim 7, wherein the IT OA&M services include IT orchestration services.

9. The Ethernet-APL based industrial system of claim 7, wherein the interworking component includes an interworking orchestration component configured to perform microservice management services for the autonomous application.

10. The Ethernet-APL based industrial system of claim 9, wherein the microservice management services includes an IT interface mapping service configured to map event types and data types of the autonomous application to one or more microservices for the external system.

11. The Ethernet-APL based industrial system of claim 9, wherein the interworking orchestration component includes a spoofing service configured to provide one or more messages of a type expected to be received by the external system.

12. The Ethernet-APL based industrial system of claim 7, wherein one or more of the plurality of Ethernet-APL edge devices is: an Ethernet-APL end point field device, or an Ethernet-APL bridge.

13. A method of monitoring and managing an Ethernet Advanced Physical Layer (Ethernet-APL) based edge device, the method comprising:
providing an Ethernet-APL based network;
connecting a plurality of Ethernet-APL based edge devices to the Ethernet-APL based network;
executing an autonomous application on each of a respective Ethernet-APL based edge device, the autonomous application configured to cause each of the respective Ethernet-APL based edge device to perform a predefined device-specific operation; and
executing an interworking component on at least one of the plurality of Ethernet-APL based edge devices, the interworking component configured to allow an external system to provide IT (information technology) operations, administration, and management (OA&M) services to the at least one of the plurality of Ethernet-APL based edge devices, wherein the interworking component includes an interworking application programming interface (API) component configured to allow the at least one of the plurality of Ethernet-APL based edge devices to interact with the external system using an API of the external system.

14. The method of claim 13, wherein IT orchestration services are provided to the at least one of the plurality of Ethernet-APL based edge devices as part of the IT OA&M services.

15. The method of claim 13, further comprising providing an interworking orchestration component in the interworking component, the interworking orchestration component configured to perform microservice management services for the autonomous application.

16. The method of claim 15, further comprising providing an IT interface mapping service in the microservice management services, the IT interface mapping service configured to map event types and data types of the autonomous application to one or more microservices for the external system.

17. The method of claim 15, further comprising providing a spoofing service in the interworking orchestration component, the spoofing service configured to provide one or more messages of a type expected to be received by the external system.

* * * * *